United States Patent [19]

Ishibashi et al.

[11] Patent Number: 5,630,064

[45] Date of Patent: May 13, 1997

[54] DATA PROCESSING APPARATUS USING READER/WRITER AND DATA CARRIER

[75] Inventors: Yoshihito Ishibashi; Masao Oba; Manabu Asakura, all of Tokyo, Japan

[73] Assignee: Tokimec, Inc., Tokyo, Japan

[21] Appl. No.: 493,307

[22] Filed: Jun. 21, 1995

[30] Foreign Application Priority Data

Jun. 24, 1994 [JP] Japan .................. 6-142842

[51] Int. Cl.$^6$ ............................ H01J 13/00
[52] U.S. Cl. .................. 395/200.05; 340/825.54
[58] Field of Search .................. 370/85.2, 85.3; 395/200.05, 200.04; 340/825.54, 825.57

[56] References Cited

U.S. PATENT DOCUMENTS

| | | | |
|---|---|---|---|
| 4,821,198 | 4/1989 | Takeuchi et al. | 364/468.23 |
| 4,827,398 | 5/1989 | Lamiaxu | 395/200.05 |
| 4,855,994 | 8/1989 | Takeuchi et al. | 370/69.1 |
| 4,866,616 | 9/1989 | Takeuchi et al. | 364/424.04 |
| 4,924,171 | 5/1990 | Baba et al. | 323/347 |
| 4,953,123 | 8/1990 | Takeuchi et al. | 365/66 |
| 5,023,887 | 7/1991 | Takeuchi et al. | 375/200 |
| 5,042,083 | 8/1991 | Ichikawa | 307/85.3 X |
| 5,043,722 | 8/1991 | Aggers et al. | 370/85.2 X |
| 5,070,500 | 12/1991 | Horinouchi et al. | 370/69.1 |
| 5,128,972 | 7/1992 | Horinouchi et al. | 375/377 |
| 5,491,741 | 2/1996 | Farwell et al. | 370/85.2 X |
| 5,517,188 | 5/1996 | Carroll et al. | 340/825.54 |
| 5,523,746 | 6/1996 | Gallagher | 340/825.54 X |
| 5,541,583 | 7/1996 | Mandelbaum | 340/825.54 |

*Primary Examiner*—David L. Robertson
*Attorney, Agent, or Firm*—Wenderoth, Lind & Ponack

[57] ABSTRACT

A response permission command is transmitted from a reader/writer, thereby setting all of data carriers to a response possible state. Subsequently, a data return command is transmitted, thereby returning data for collation on a bit unit basis. The reader/writer transmits a data collation command of, for example, bit 0 to each of the data carriers when recognizing the return of the data in which bits 0 and 1 mixedly exist. When an own return bit coincides with a collation bit, each of the data carrier judges that the collation succeeds and returns a next bit for collation. When they don't coincide, however, a state of the data carrier is switched to a response inhibition state. By repeating such processes with respect to all of the bits of the data for collation, only one data carrier finally remains in a response possible state and generates an access permission command, thereby performing the reading or writing operation. When the operation is finished, the state is switched to an access inhibition state by an access inhibition command. The processes from the transmission of the response permission command are again repeated for the remaining data carriers.

21 Claims, 12 Drawing Sheets

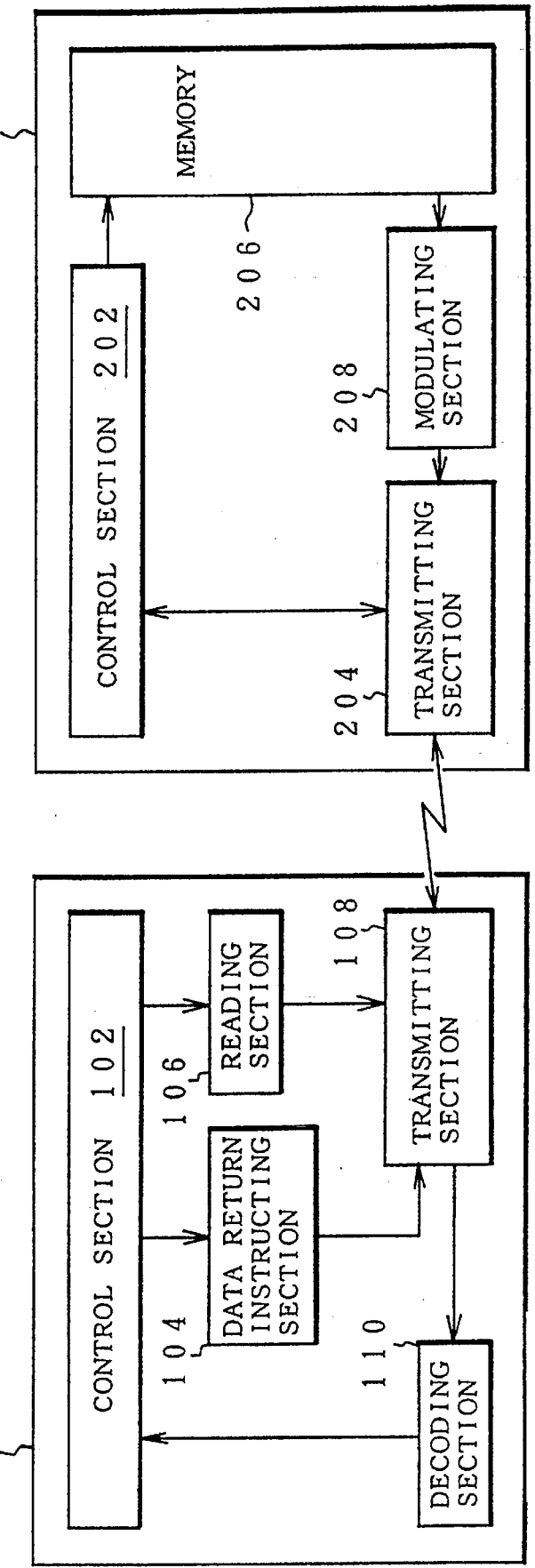
FIG. I
PRIOR ART

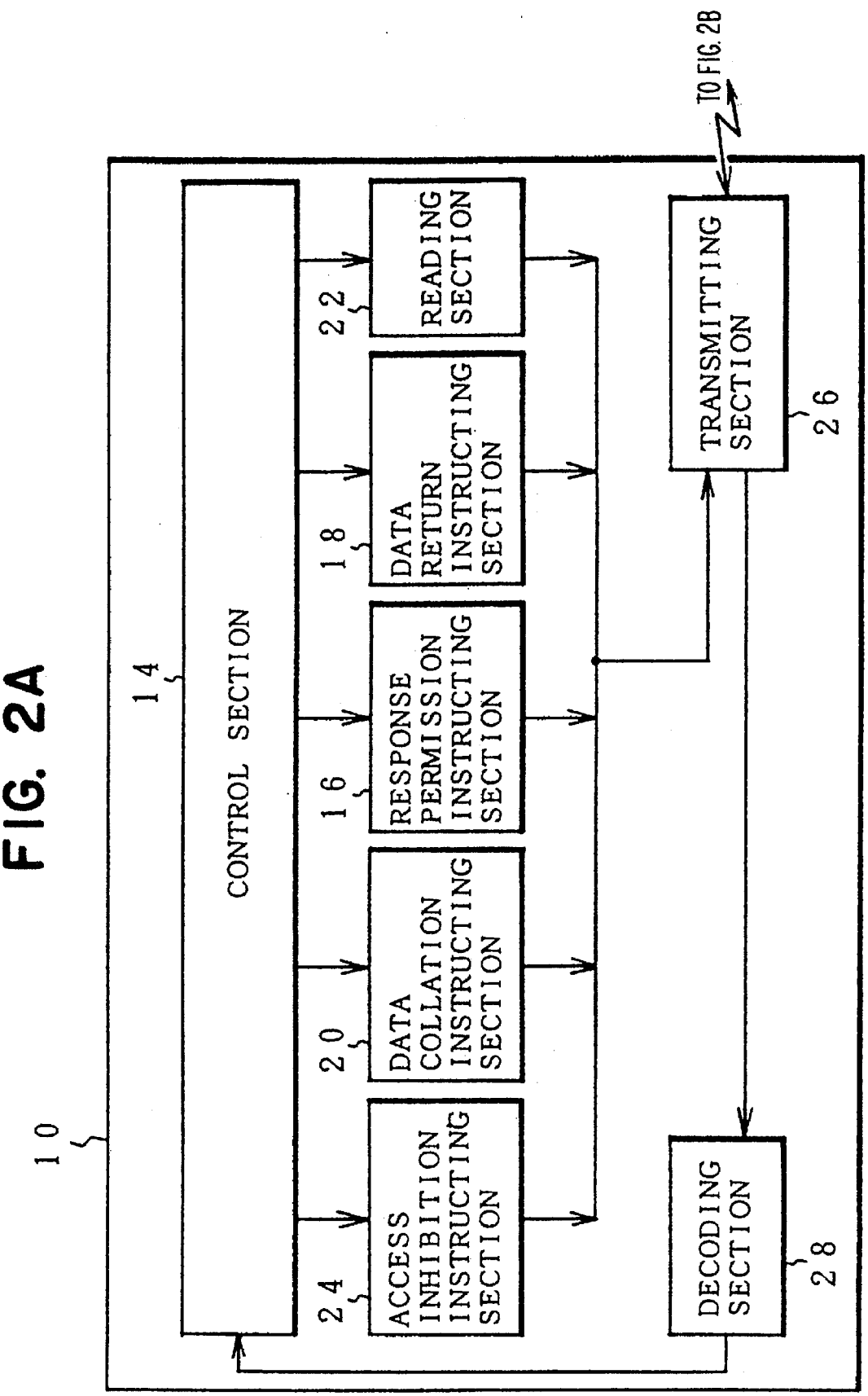

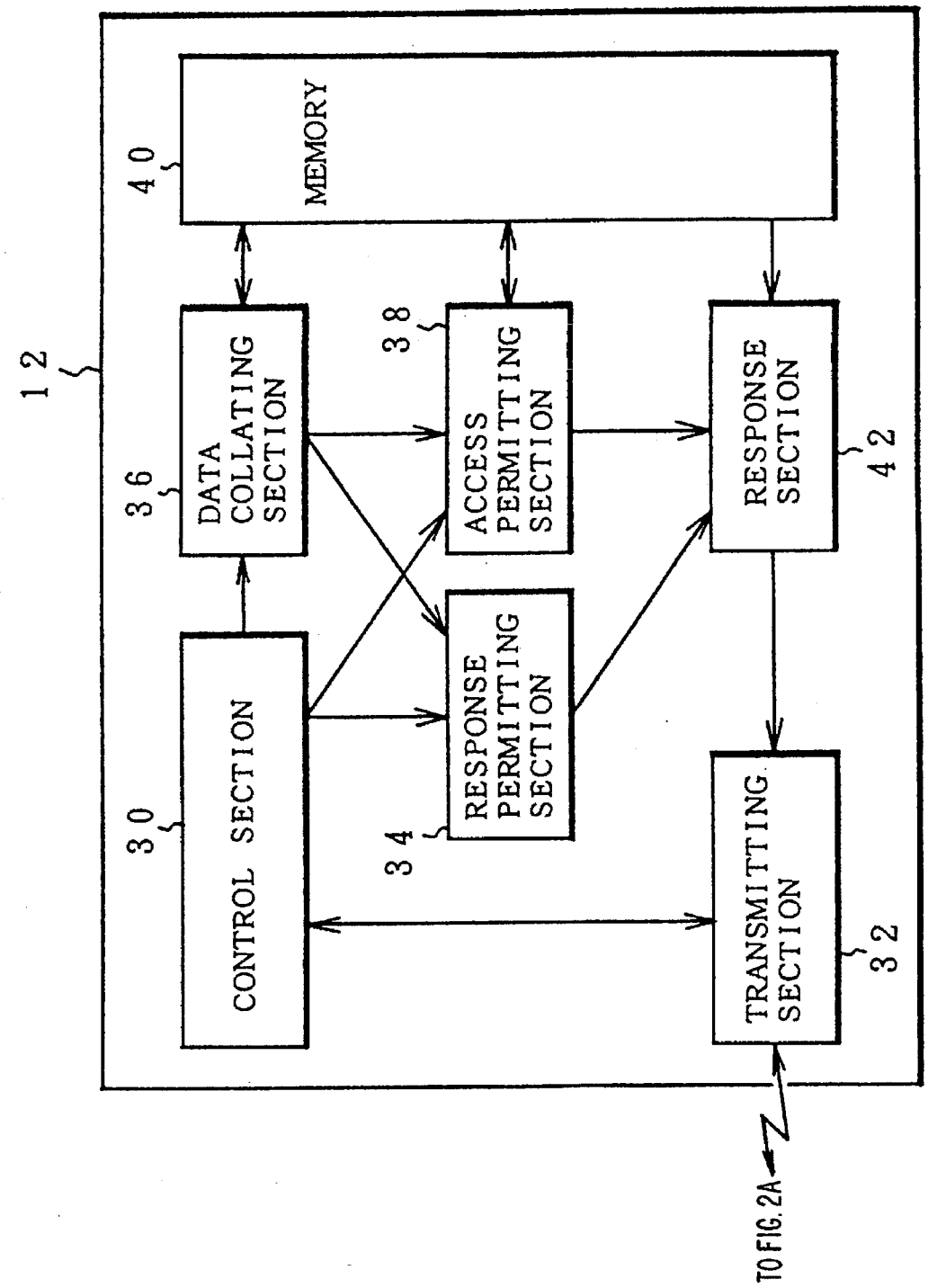

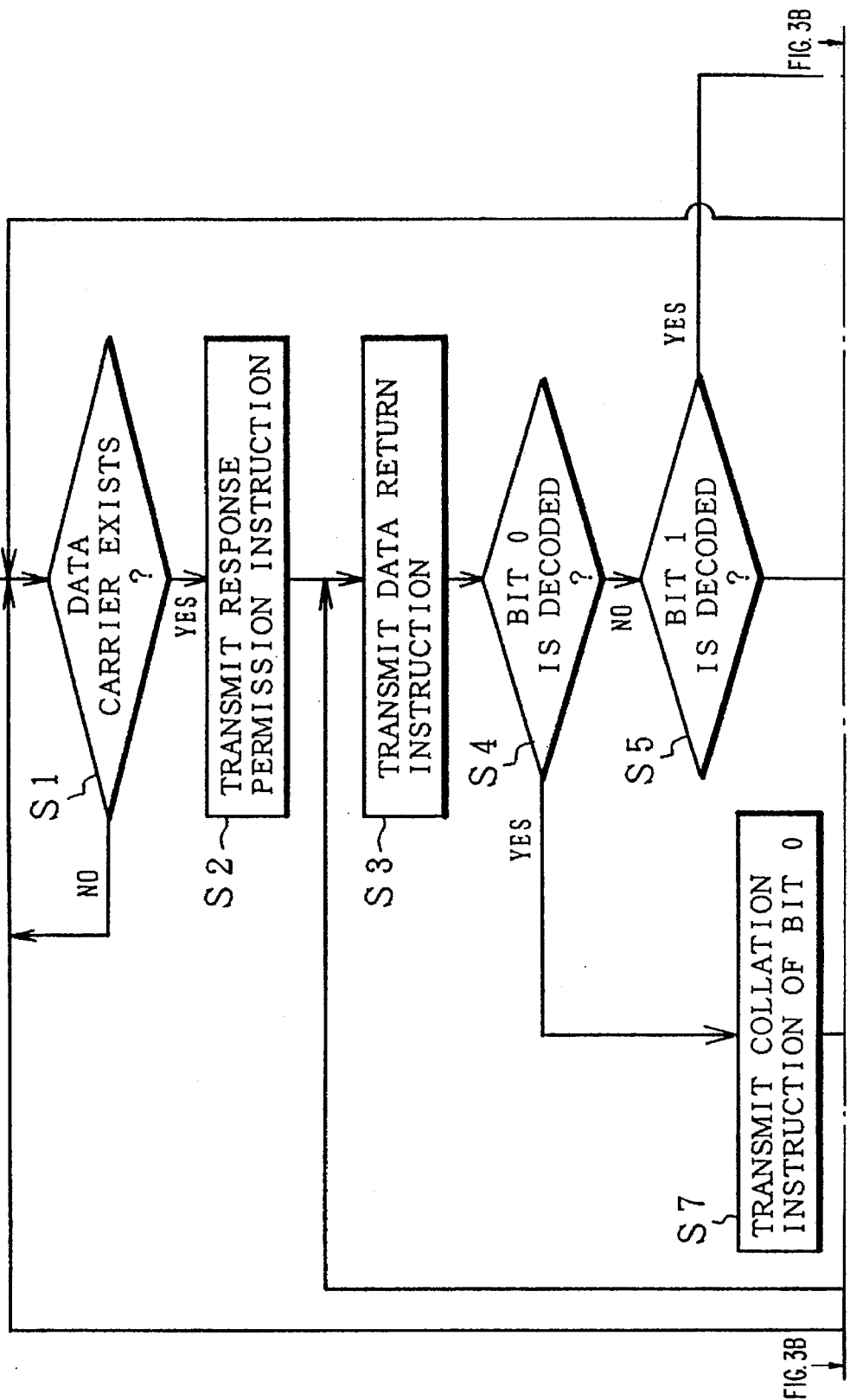

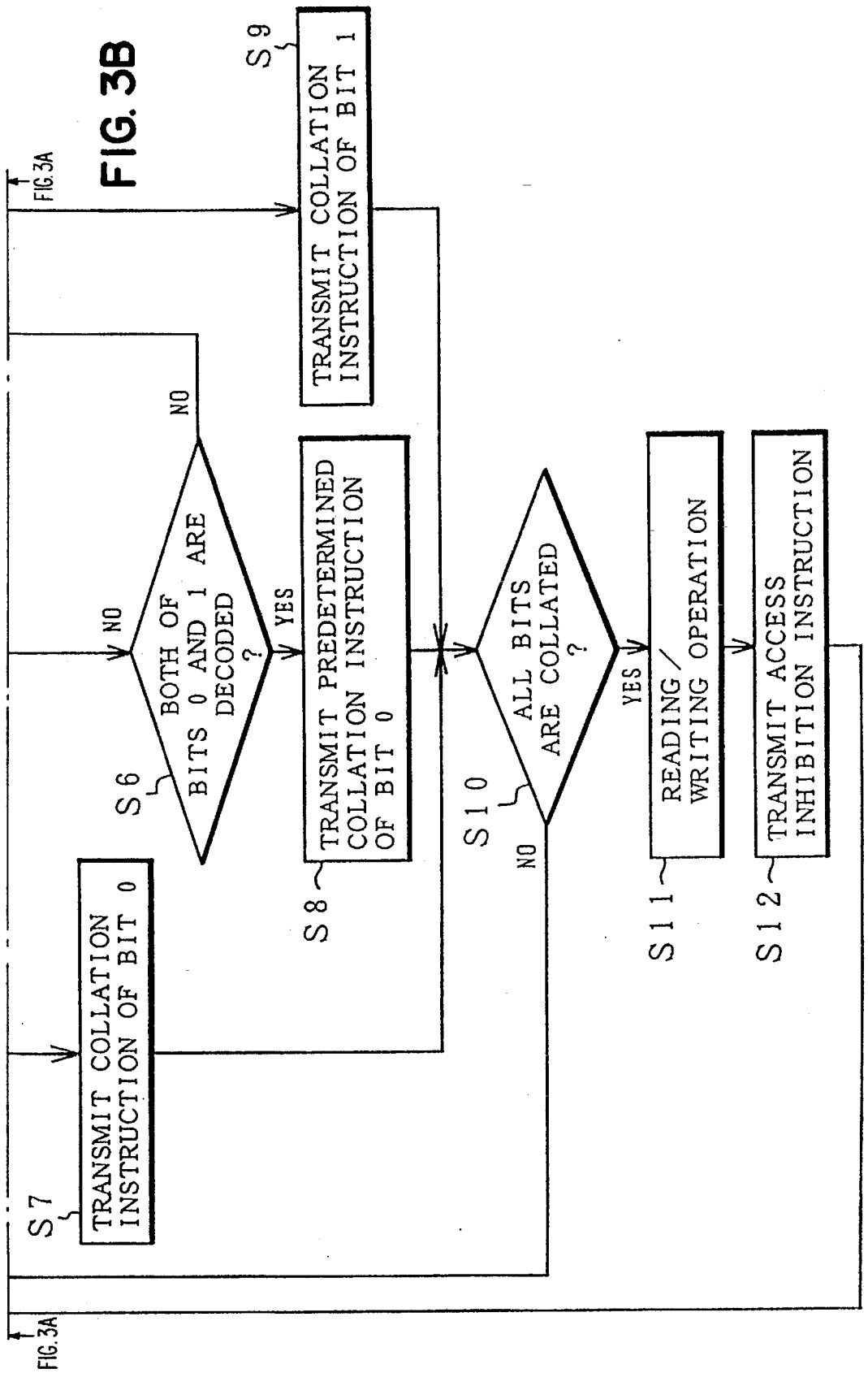

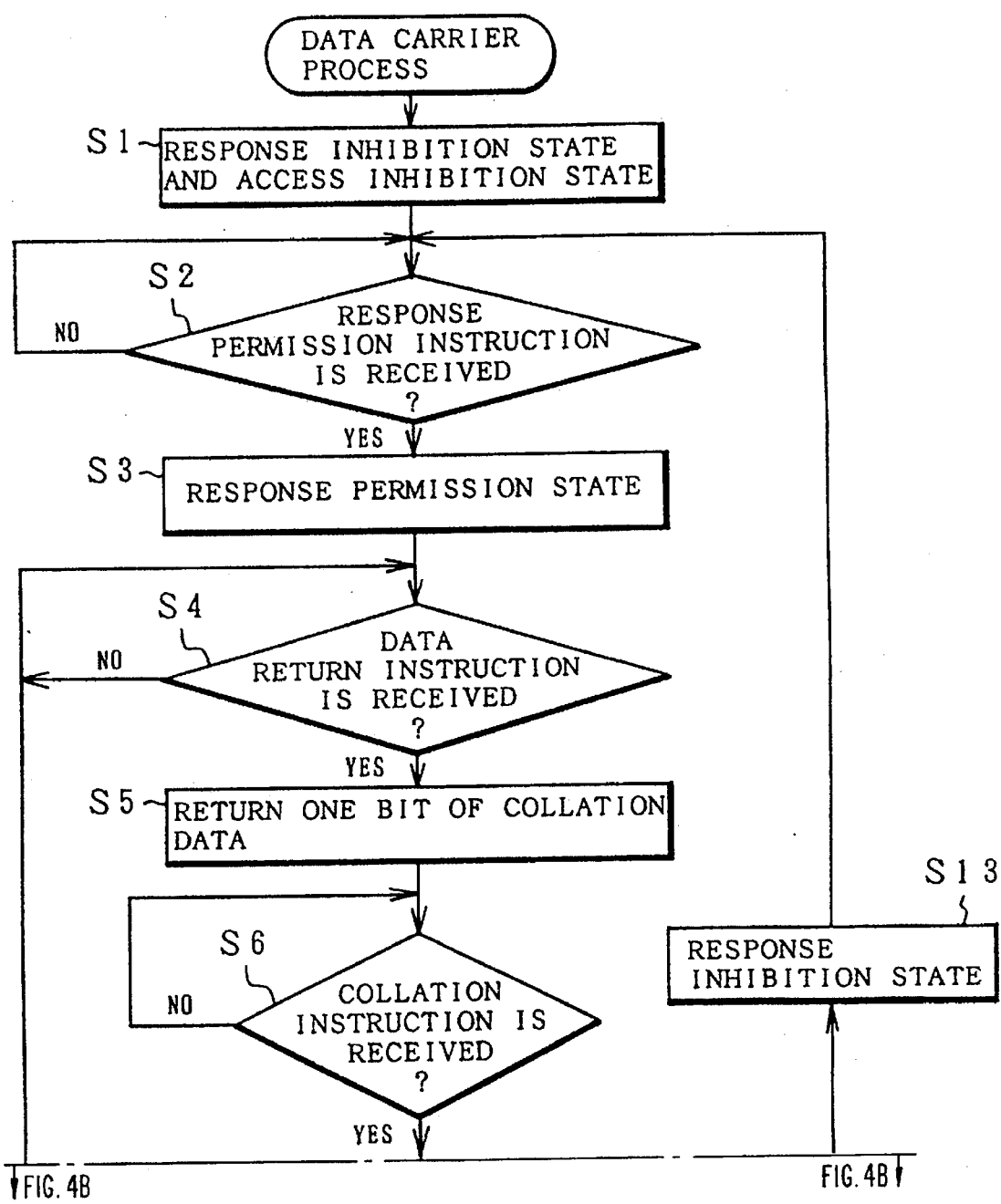

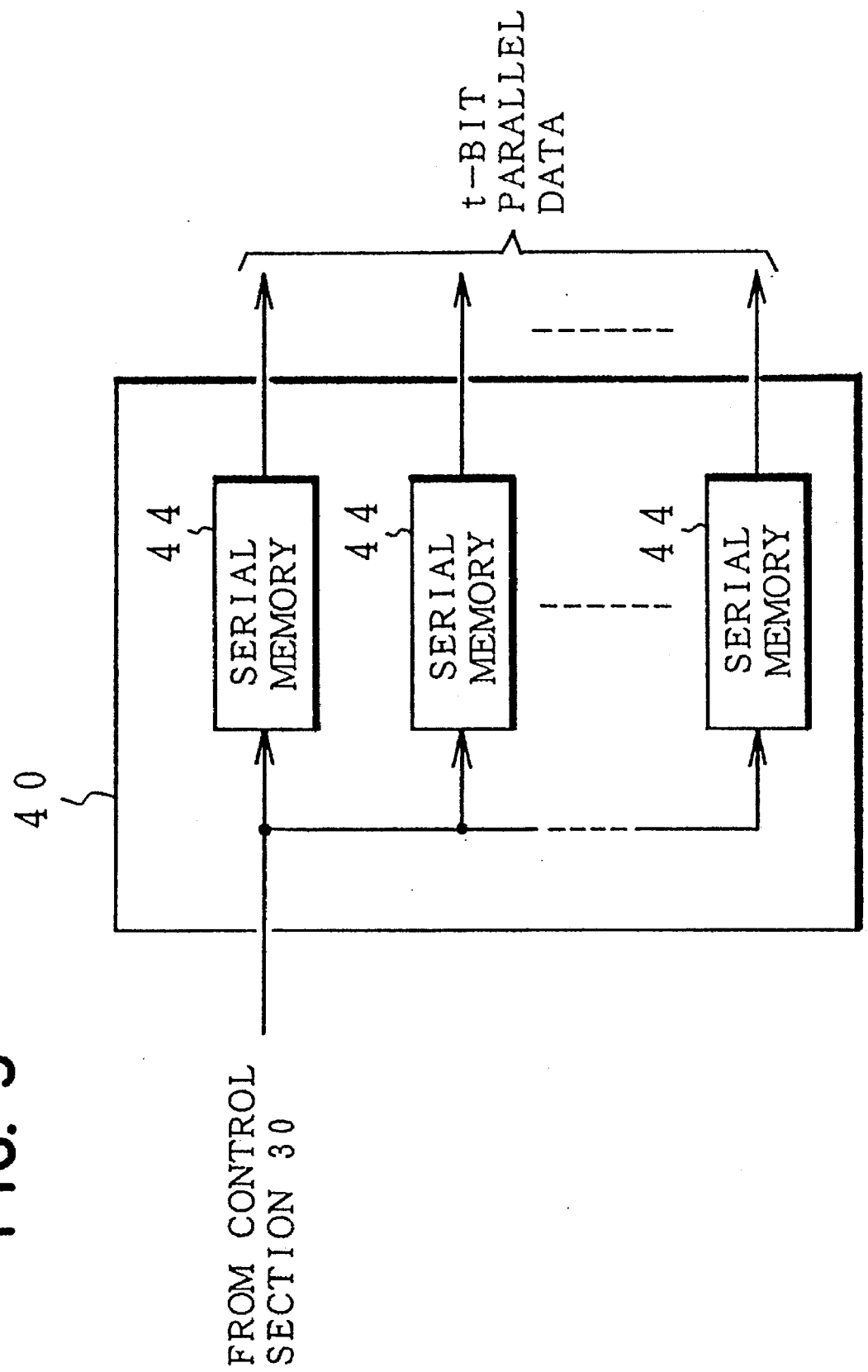

DATA PROCESSING APPARATUS USING READER/WRITER AND DATA CARRIER

BACKGROUND OF THE INVENTION

The present invention relates to a data processing apparatus for reading data stored in a memory of a data carrier by a communication due to a contactless coupling by a reader/writer and for processing the data. More particularly, the invention relates to a data processing apparatus using a reader/writer and data carriers, in which when a plurality of data carriers simultaneously access to one reader/writer, data is read out from each of the data carriers and the data is eventually read out from all of the data carriers.

Hitherto, as such a type of data processing apparatus, for example, there is an apparatus shown in FIG. 1. In FIG. 1, a reader/writer 100 comprises: a control section 102; a reading section 106; a data return command section 104; a transmitting section 108; and a decoding section 110. A data carrier 200 comprises: a control section 202; a memory 206; a modulating section 208; and a transmitting section 204. When performing a reading operation from the reader/writer 100 to the data carrier 200, a read command is transmitted by the reading section 106. The read command is constructed by, for example, [(a read command)+(a read start address)] or the like. The data carrier 200 which received such a command sets the memory 206 into a reading state and also sets an address or the like as necessary. The reader/writer 100 subsequently transmits a data return command. The data carrier 200 which received such a command reads out the data from the memory 206 on a unit basis of a specified number of bits and converts the data to a transmission signal by the modulating section 208 and transmits the signal by the transmitting section 204. The reader/writer 100 receives the signal from the data carrier 200 and decodes data by the decoding section 110. The apparatus repeats the above processes a number of times as many as the number of bits of the data to be read out, thereby reading out target data as a result. In such a conventional data processing apparatus, however, there is a problem such that when two or more data carriers 200 simultaneously access to the reader/writer 100, the data cannot be correctly read out.

SUMMARY OF THE INVENTION

According to the invention, there is provided a data processing apparatus using a reader/writer and data carriers in which even if a plurality of data carriers are accessed by a reader/writer, data can be sequentially read out or written from/into the data carriers in accordance with the order.

The invention provides a data processing apparatus for executing at least a data reading operation from data carriers by a reader/writer. In this instance, the data carrier denotes a portable unit having a memory module therein and has a function to communicate with the outside in a contactless manner. Ordinarily, such a unit is enclosed in a coin-shaped or capsule-shaped package and is attached to a target to be used or is held by the user.

The data carrier includes: a memory for holding data; a response section for returning a predetermined signal in accordance with data read out from a memory when receiving a predetermined command from a reader/writer; a response permitting section for permitting the response section to return the data; and a data collating section for collating data for collation added to a data collate command transmitted from the reader/writer with the data held in the memory and, when such a collation succeeds, for permitting the reading of the next data.

The reader/writer includes: a response permission command section for permitting the response section of the data carrier to permit the return of the data; a data return command section for returning a signal corresponding to the data from the memory held in the data carrier; a decoding section for decoding the reception data returned from the data carrier; and a data collation command section for allowing the data collating section of the data carrier to collate the reception data decoded by the decoding section.

In this instance, the response section of the data carrier returns a predetermined pseudo random signal in accordance with the data read out from the memory. In correspondence to such means, a correlation operating section for calculating an auto-correlation between the pseudo random signal returned from the data carrier and the predetermined pseudo random signal is provided for the decoding section of the reader/writer. The reception data is decoded from the auto-correlation.

When the collation by the data collating section fails, the data carrier inhibits a response of the response permitting section. When the response is permitted by the response permitting section, the data carrier permits the reading of a certain specific address. After the data carrier was set to a response permission state by using the response permitting section, the reader/writer allows the data collation command section to collate the read-out data obtained by the data return command section with data up to a predetermined data length. When the data collating section succeeds in collation of the data of the predetermined length, the access permitting section permits at least the reading from all of or a part of the areas in the memory.

When the reader/writer simultaneously receives the data returned from a plurality of data carriers, a plurality of correlation values are obtained by the correlation operating section. When either two or more kinds of auto-correlation values among them are larger than a threshold value, the data collating section executes the collation by using any one of the decoded data of a plurality of auto-correlation values.

When the decoded data obtained by the decoding section is not correctly decoded, the reader/writer can also allow the data collating section to collate by using possible decoded data.

When receiving the access inhibition command from the reader/writer, the data carrier sets the access permitting section and response permitting section to an inhibition state. For this purpose, an access inhibition command section for setting the access permitting section and the response permitting section of the data carrier to the access inhibition state is provided for the reader/writer. When receiving the access inhibition command from the reader/writer, the data carrier can also set the access permitting section and the response permitting section to the inhibition state until an access permission command is received from the reader/writer. In this case, an access inhibition command section for setting the access permitting section and response permitting section of the data carrier to an access inhibition state and an access permission command section for setting the data carrier in the access inhibition state to an accessible state are provided for the reader/writer.

When receiving the access inhibition command from the reader/writer, the data carrier sets the reading operation from the memory to an absolute inhibition state. At the time of the power-on reset, the data carrier releases the absolute inhibition state of the reading operation based on the access inhibition command and sets to a readable state. Therefore, the reader/writer has the access inhibition command section for setting the reading operation from the data carrier to the absolute inhibition state.

When all of the auto-correlation values obtained from the correlation operating section are smaller than a threshold value, the reader/writer judges that the response processes with all of the data carriers were finished. When the signal obtained from the transmitting section is smaller than a certain threshold level, the reader/writer may also judge that the response processes with all of the data carriers were finished. The response permitting section of the data carrier compares data of a predetermined data length in a predetermined address of the memory and response permission data sent from the reader/writer and permits to return the data when all or a specific portion of the data coincide.

When only one kind of auto-correlation value among a plurality of correlation values obtained by the correlation operating section is equal to or larger than the threshold value, the reader/writer doesn't transmit the data collation command but transmit a next data return command. In this case, after predetermined data was returned according to the read-out data from the memory in accordance with the data return command, when the data carrier receives the data return command again, it is regarded that the data collation according to the preceding data collation command succeeded, so that a response speed can be raised.

In such a data processing apparatus of the invention, when the reader/writer simultaneously accesses a plurality of data carriers, a situation is as follows. In the data carrier which entered an accessible area of the reader/writer and whose power source was turned on, both of the response permission and the access permission are in the inhibition state in an initial state. The reader/writer first transmits a response permission command. In response to it, all of the data carriers are set to a response possible state. Subsequent to the response permission command, the reader/writer transmits a data return command of data to be used in the collation. Consequently, a plurality of data carriers in the response permission state return data all together. The data which is returned by the data carriers for collation differs. For example, the data is returned on a bit unit basis.

When the reader/writer which received the data returned from a plurality of data carriers recognizes the return of the data in which bit 0 and bit 1 mixedly exist, the reader/writer transmits a data collation command using a predetermined bit, for example, bit 0 to a plurality of data carriers. When the data bit of the data collation command coincides with the data bit returned by itself, the data carrier judges that the collation is successful and returns the next data bit for collation. On the other hand, when the data bit returned by itself doesn't coincide with the data bit of the data collation command, the data carrier judges that the collation fails and switches its own response permission state to the response inhibition state. Therefore, among the plurality of data carriers, the state of the data carrier in which the return data bit and the collation data bit don't coincide is switched to the response inhibition state and such a data carrier doesn't respond to the data return command from the next reader/writer. By repeating such processes with respect to all of the bits of the data for collation, only one data carrier finally remains in the response possible state. The access permission command is, therefore, generated from the reader/writer, thereby performing the reading or writing operation.

When the reading operation or writing operation is finished, the reader/writer transmits the access inhibition command, switches the state of the data carrier in which the reading/writing operation was finished to the access inhibition state, and again repeats the processes from the transmission of the response permission command for the remaining data carriers. Consequently, even when a plurality of data carriers simultaneously access (return) for the data return command subsequent to the response permission command from the reader/writer, the data carriers can be sequentially accessed in accordance with the order and the data can be correctly read out without causing any interference of the data.

The above and other objects, features, and advantages of the present invention will become more apparent from the following detailed description with reference to the drawings.

BRIEF DESCRIPTION OF THE DRAWINGS

FIG. 1 is a block diagram of a conventional apparatus;

FIG. 2 is a block diagram showing an embodiment of the invention;

FIG. 3 is a flowchart showing processes of a reader/writer of the invention;

FIG. 5 is an explanatory diagram of a memory construction which is used in the data carrier of the invention;

DETAILED DESCRIPTION OF THE PREFERRED EMBODIMENTS

Figure 4B:
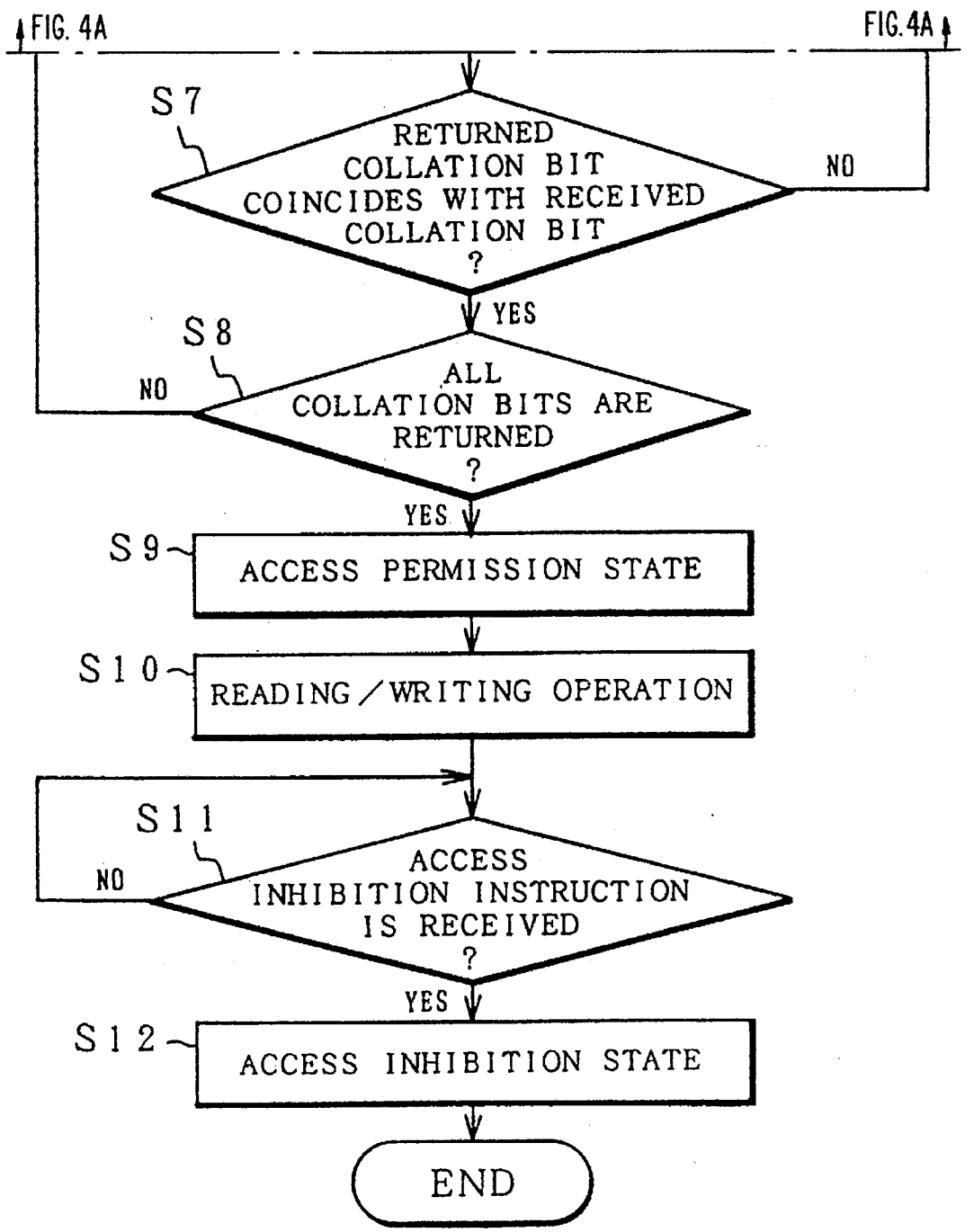
FIG. 4 is a flowchart showing processes of a data carrier of the invention.

In FIG. 2, a reader/writer 10 comprises: a control section 14; a response permission command section 16; a data return command section 18; a data collation command section 20; a reading section 22; an access inhibition command section 24; a transmitting section 26; and a decoding section 28. A data carrier 12 comprises: a control section 30; a transmitting section 32; a response permitting section 34; a data collating section 36; an access permitting section 38; a memory 40; and a response section 42. In case of executing the reading operation of the data carrier 12 from the reader/writer 10, the control section 14 of the reader/writer 10 first sets the data carrier 12 to a response permission state by using the response permission command section 16. In this instance, when there are a plurality of data carriers 12 in a range in which it is possible to access to the reader/writer 10, all of the data carriers 12 enter the response possible state. The control section 14 of the reader/writer 10 returns data for collation to the data carrier 12 by using the data return command section 18. In this instance, the data carrier 12 is in a state in which the reading operation of a specific address in the memory 40 in which the data for collation has been stored is permitted only once. The data carrier 12 returns the data for collation in accordance with a data return command from the reader/writer 10 by using the response section 42. When the return signals from all of the data carriers 12 are identical at this time, in the case where the signals are decoded by the decoding section 28 of the reader/writer 10, only one kind of signal can be extracted. In the case where the different data to be returned from a plurality of data carriers 12 are mixed, however, plurality of kinds of signals are decoded by the decoding section 28 (in case of a spread spectrum communication system) or a situation such that although there is a reception signal, a kind of data cannot be known is derived.

For simplicity of explanation, it is now assumed that there are three data carriers 12-1, 12-2, and 12-3 to be accessed by the reader/writer 10, the data collation is executed one bit by one, total four bits are collated, and the data carriers 12-1, 12-2, and 12-3 have data 1111, 1001, and 1010 for collation, respectively. It is also assumed that in the case where a plurality of signals are mixedly returned, although the signals are not correctly decoded but it is known that the signals denote data. The reader/writer 10 transmits the response permission command from the response permission command section 16 prior to the reading from the data carriers 12-1 to 12-3. In this instance, in a plurality of data carriers 12-1 to 12-3 which are in a reset state due to the power-on start, both of the response permitting sections 34 and the access permitting sections 38 are in an inhibition state at that time point. Each of the data carriers 12-1 to 12-3 which received the response permission command from the reader/writer 10 sets the response permitting section 34 to a permission state and subsequently returns the collation data of the first bit for the data return command which is transmitted from the data return command section 18 of the reader/writer 10. At that time, since each of three data carriers 12-1 to 12-3 returns the same data bit 1, bit 1 is correctly decoded by the decoding section 28 of the reader/writer 10. The data collation command section 20 transmits the data collation command to the data carriers 12-1 to 12-3 by using bit 1 decoded by the decoding section 28. In the data collating section 36 of each of the data carriers 12-1 to 12-3 which received the data collation command, all of the collations are successful and the next one bit can be read out. When the collation data of the second bit is returned, bits 1 and 0 are mixed, so that the kind of data cannot be known. In the case where although the decoded data of the decoding section 28 is the data, its kind cannot be known, either one of data bits 0 and 1 is selected and the data collation command is transmitted. Assuming that bit 0 was selected and the data collation command was transmitted, only the second and third data carriers 12-2 and 12-3 succeed in the collation and the first data carrier 12-1 fails the collation. The first data carrier 12-1 which failed the collation enters the response inhibition state and doesn't respond to the subsequent data return commands from the reader/writer 10. When the reader/writer 10 outputs the data return command, since the return data of the second and third data carriers 12-2 and 12-3 differ, the correct data is not decoded. When bit 0 is selected and the data collation command is generated, the third data carrier 12-3 fails the collation and enters the response inhibition state. Thus, only the second data carrier 12-2 can respond until the last time and enters the access possible state at the time of the completion of the fourth collation. After that, the reading operation, writing operation, or the like of the data is executed to the second data carrier 12-2 in the access possible state from the reader/writer 10. When a desired data reading/writing operation for the data carrier 12-2 is finished, the reader/writer 10 transmits the access inhibition command by using the access inhibition command section 24, thereby setting the access of the second data carrier 12-2 to the inhibition state. Further, the reader/writer 10 subsequently transmits again the response permission command to the data carriers 12-1 to 12-3 by using the response permission command section 16. At this time, however, the second data carrier 12-2 to which the reading and writing operations of data were finished and which entered the access inhibition state doesn't enter the response permission state. The first and third data carriers 12-1 and 12-3 to which the reading and writing operations remain enter the response permission state.

As mentioned above, when the data return command is generated and the collation data is returned every bit in a manner similar to that of the first time with respect to the first and third data carriers 12-1 and 12-3 in the response permission state, the decoded data is not distinguished at the second-time data return. In response to the reception of the data collation command which selected bit 0, the first data carrier 12-1 fails the collation and enters the response inhibition state and the second data carrier 12-2 is in the access inhibition state, so that only the third data carrier 12-3 can respond. Thus, the third data carrier 12-3 enters the access permission state at the fourth-time collation and the reading or writing operation of the data is performed. After that, the third data carrier 12-3 is set to the access inhibition state by the access inhibition command. Only the first data carrier 12-1 remains in this state. As for the second and third data carriers 12-2 and 12-3, the reading and writing operations have been finished and are in the access inhibition state. Therefore, by the fourth-time collation subsequent to the data return command next to the third-time response permission command, the data carrier 12-1 enters the access permission state, so that data can be also read and written from/to the first data carrier 12-1.

In the operation explanation of FIG. 1, the case where when two kinds of signals are simultaneously transmitted from the three data carriers 12-1 to 12-3, data cannot be correctly decoded has been described as an example. In the data transmission from the data carrier 12 to the reader/writer 10, by using pseudo random signals of the spread spectrum communication, it is recognized that two kinds of signals were simultaneously transmitted, so that the corresponding collation command can be transmitted.

In this instance, it is assumed that two kinds of pseudo random signals corresponding to data bits 0 and 1 to be transmitted from the data carrier 12 are set to M0 with respect to data bit 0 and M1 with respect to data bit 1, respectively, and they have the following code series.

M0={000100110101111}

M1={110101111000100}

In this instance, the sum (M0+M1) of the pseudo random signals M0 and M1 and correlation values $C_0$ and $C_1$ of the pseudo random signals M0 and M1 are calculated by the following expressions (1) and (2).

The calculations are performed by assuming that bit $0=-1$ and bit $1=+1$, here.

$$C_0 = \sum_{i=1}^{15} (M0 + M1) \cdot M0 \tag{1}$$

$$= \{0\ 0\ -2\ 2\ -2\ 0\ 2\ 2\ 0\ 0\ -2\ 0\ 2\ 0\ 0\} \cdot$$

$$\{-1\ -1\ -1\ 1\ -1\ -1\ 1\ 1\ -1\ 1\ -1\ 1\ 1\ 1\ 1\} =$$

$$= +0+0+2+2+2+0+2+2+0+0+2+0+2+0+0$$

$$= +14$$

$$C_1 = \sum_{i=1}^{15} (M0+M1) \cdot M1 \qquad (2)$$

$$= \{0\ 0\text{–}2\ 2\text{–}2\ 0\ 2\ 2\ 0\ 0\text{–}2\ 0\ 2\ 0\ 0\} \cdot$$

$$\{1\ 1\text{–}1\ 1\text{–}1\ 1\ 1\ 1\ 1\text{–}1\ 1\text{–}1\ 1\ 1\ 1\text{–}1\text{–}1\} =$$

$$= +0+0+2+2+2+0+2+2+0+0+2+0+2+0+0$$

$$= +14$$

The auto-correlation of the pseudo random signals M0 and M1, namely, each of the correlation of the pseudo random signals M0 and M0 and the correlation of the pseudo random signals M1 and M1 is equal to 15 and the correlation of the pseudo random signals M0 and M1 is equal to −1. The correlation value of each of the pseudo random signals M0 and M1 as reference signals for the signal (M0+M1) when two kinds of pseudo random signals M0 and M1 in the case where data bits 0 and 1 mixedly exist were simultaneously received as mentioned above is equal to $C_0=C_1=14$. Thus, whether two signals have been mixedly inputted or only one signal has been inputted or only the noises have been inputted can be judged.

A flowchart of FIG. 3 shows a processing operation in the case where the response section 42 of the data carrier 12 transmits the pseudo ransom signals M0 and M1 for data bits 0 and 1 from the memory 40, the pseudo random signals M0 and M1 are held as reference signals in the decoding section 28 of the reader/writer 10, the auto-correlation is calculated between the reception series, and the reception bit is decoded from the calculation result. In FIG. 3, the reader/writer 10 checks the presence or absence of the data carrier 12 in step S1. When the presence of the data carrier 12 is recognized, step S2 follows and the response permission command is transmitted to the data carrier 12 by the response permission command section 16. The data carrier 12 which received the response permission command enters at least the response permission state of the collation data. In step S3, the data return command is transmitted from the data return command section 18. The data return command denotes a command to return the data one bit by one from the data carrier 12. The pseudo random signal due to the reading of the first one bit of the collation data in a specific address of the memory 40 which has previously been held is returned from the data carrier 12 in response to the data return command. A checks is made to see if the bit decoded by the decoding section 28 is bit 0 or not in step S4, bit 1 or not in step S5, and both of bits 0 and 1 or not in step S6. When bit 0 is decoded, the data collation command of bit 0 is transmitted by the data collation command section 20 in step S7. When bit 1 is decoded, step S9 follows and the data collation command of bit 1 is transmitted. Further, in the case where a plurality of data carriers 12 exist and both of bits 0 and 1 are decoded, the data collation command of a predetermined bit, for example, bit 0 is transmitted in step S8. The above processes in steps S3 to S8 are repeated until the bit collation of all of the bits, for example, four bits of the predetermined collation data are finished in step S10. In this instance, even if there are a plurality of data carriers 12, only one data carrier 12 is in the response permission state at the time of the end of the collation of all bits. In step S11, the reading or writing operation is executed for such a data carrier 12. After the transmission of the read command and write address, the reading operation in step S11 repeats the transmission of the data return command of the number of data bits to be read. As for the writing operation, subsequent to the write command and write address, write data is transmitted. When the reading or writing operation in step S11 is finished, step S12 follows and the access inhibition command is transmitted by the access inhibition command section 24, thereby setting both of the response permitting section 34 and access permitting section 38 of the data carrier 12 in which the reading and writing operations were finished to the inhibition state.

A processing operation of the data carrier 12 in a flowchart of FIG. 4 is executed for the reader/writer processes of FIG. 3. The data carrier 12 rectifies a transmission signal from, for example, the reader/writer 10 and forms an internal power source. Consequently, a power source voltage is obtained from the reception signal when the reader/writer 10 enters an access possible range thereof and the operation is started by the power-on start. The flowchart of FIG. 4 shows the processing operation by the power-on start. In a reset state at the time of the power-on start, as shown in step S1, the data carrier 12 is in the response inhibition state and the access inhibition state. That is, both of the response permitting section 34 and access permitting section 38 are in the inhibition state. In such an inhibition state, when the response permission command from the reader/writer 10 is received in step S2, the response permitting section 34 enters the permission state, thereby forming the response permission state such that it is possible to once access to the collation data stored in a specific address of the memory 40. When the data return command from the reader/writer 10 is received in step S4, one bit of the collation data of the memory 40 is read out and is converted to a pseudo random signal by the response section 42 and is returned in step S5. When the data collation command from the reader/writer 10 is received in step S6, step S7 follows and a check is made by the data collating section 36 to see if the collation bit returned in step S5 coincides with the reception collation bit by the received collation command or not. If YES, the presence or absence of the return of all of the collation bits is discriminated in step S8 and the processing routine is again returned to step S4. After waiting for the reception of the data return command, the next collation bit is returned. On the other hand, when the return collation bit doesn't coincide with the reception collation bit, step S13 follows and the response permitting section 34 is set to the response inhibition state and the processing routine is returned to step S2. Therefore, the data carrier in which the collation bit doesn't coincided in the halfway for the subsequent data return command doesn't respond. When all of the collation bits are returned in step S8, step S9 follows and the access permitting section 38 is set to the permission state, thereby forming the access permission state for a part or all of the memory 40. Subsequently, step S10 follows and the reading or writing operation of the memory 40 is performed for the read access or write access from the reader/writer 10. When the reading or writing operation is finished, the data carrier waits for the reception of the accessed inhibition command from the reader/writer 10 in step S11. When the access inhibition command is received, in step S12, the state of the data carrier is switched to the access inhibition state in which both of the response permitting section 34 and access permitting section 38 are set to the inhibition state. When the state is once switched to the access inhibition state, the power supply to the data carrier 12 is cut off. So long as the data carrier is not again turned on and started by the power supply, the data carrier doesn't respond to the subsequent commands from the reader/writer 10.

In the memory 40 of the data carrier 12 in FIG. 2, the case where the data is read out and returned one bit by one in response to the data return command from the reader/writer 10 has been explained as an example. It is also possible to read out parallel data of a plurality of bits for the data return command and to return by the pseudo random signals.

FIG. 5 shows the first embodiment of the memory 40 to read out a plurality of bits for the data return command. In the first embodiment in FIG. 5, (t) serial memories 44-1 to 44-t are provided. Parallel data of (t) bits is read out by the parallel reading operations of the serial memories 44-1 to 44-t by an output from the control section 30 based on the data return command.

Figure 6:
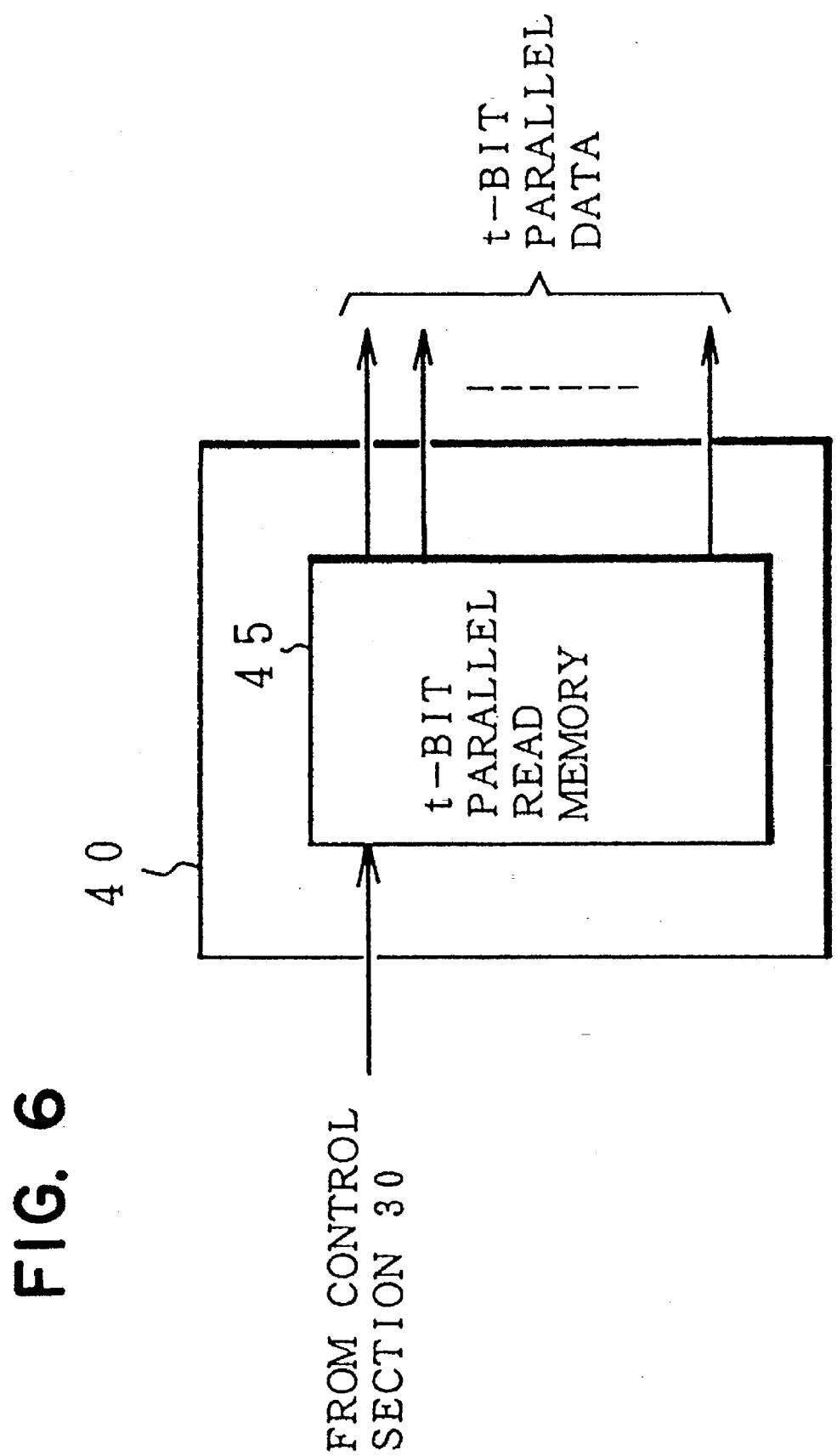
FIG. 6 is an explanatory diagram of another embodiment of the memory construction which is used in the data carrier of the invention.

FIG. 6 shows the second embodiment of the memory 40 for performing the parallel reading operation of a plurality of bits for the data return command. The second embodiment is characterized in that a t-bit parallel read memory 45 is provided for an output from the control section 30 based on the data return command, thereby reading out t-bit parallel data.

Figure 7:
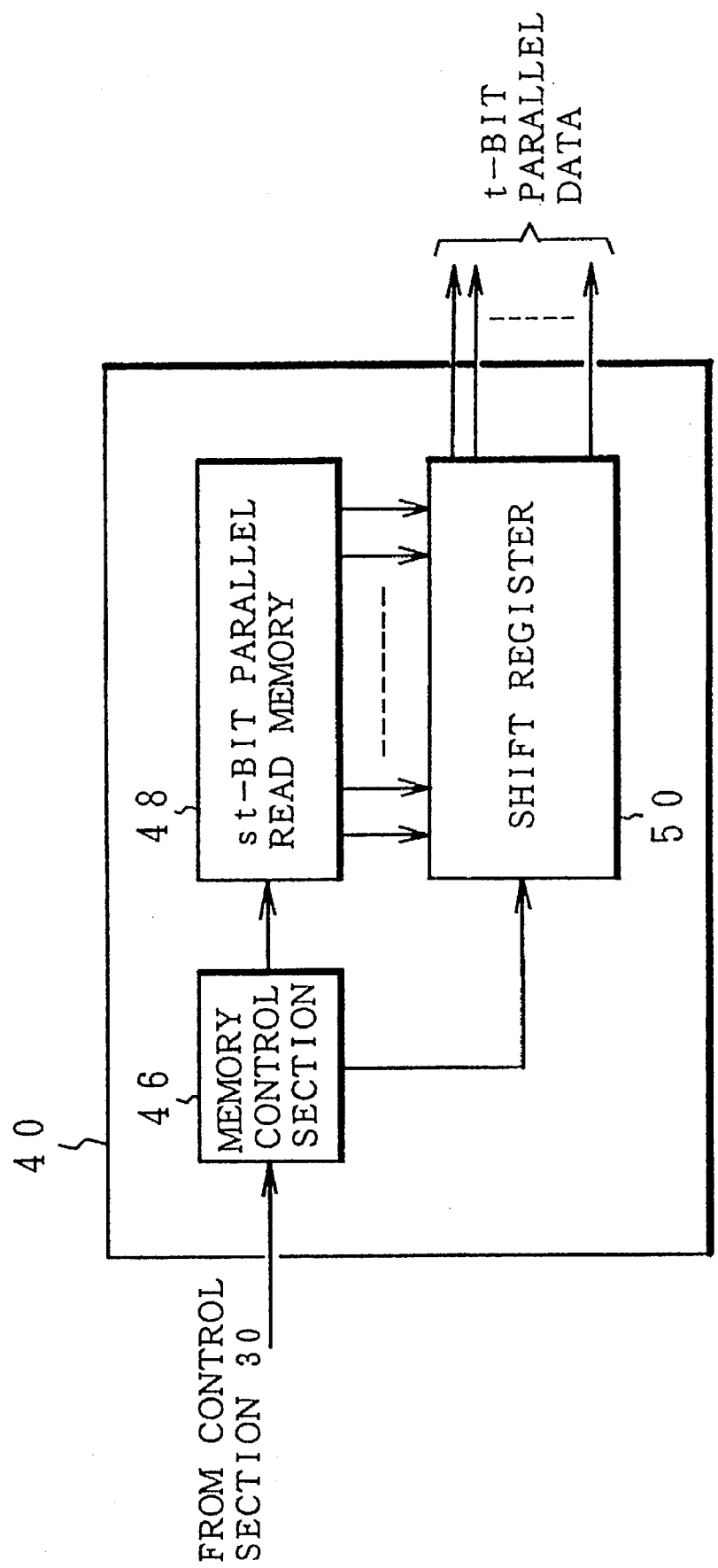
FIG. 7 is an explanatory diagram of still another embodiment of the memory construction which is used in the data carrier of the invention.

FIG. 7 shows the third embodiment of the memory 40 for performing the parallel bit reading operation for the data return command. In the embodiment, a memory control section 46, an st-bit parallel read memory 48, and a shift register 50 are provided for the memory 40. In this instance, the st-bit parallel read memory 48 denotes a memory from which parallel data that can be read out (s) times with a bit width (t) is read out by only one access. Therefore, a counter and an address register are provided for the memory control section 46. When the control section 30 receives a read address subsequent to a read command, a reception address is set to the address register of the memory control section 46. Subsequently, when the first data return command is received, the control section 30 reads and accesses the st-bit parallel read memory 48 by an address designation by the address register, reads out the parallel data of the number as many as the number of (s×t) bits to the shift register 50, and outputs the first parallel data of the number as many as the number of (t) bits. In the memory control section 46, the counter is increased by one. Subsequently, when the second data return command is received, the control section 30 outputs a shift signal to the shift register 50, outputs the next parallel data of the number as many as the number of (t) bits, and increases the counter of the memory control section 46. Such a shifting operation for every reception of the data return command is repeated until a count value of the counter of the memory control section 46 reaches (s). When the counter reaches (s), this means that the output of the data of the number as many as the number of (s×t) bits is completed, the register is cleared to 0, the address register is also increased by one, and the data is transferred to the shift register 50 by the reading from the st-bit parallel read memory 48 on the basis of the next data return command.

Figure 8:
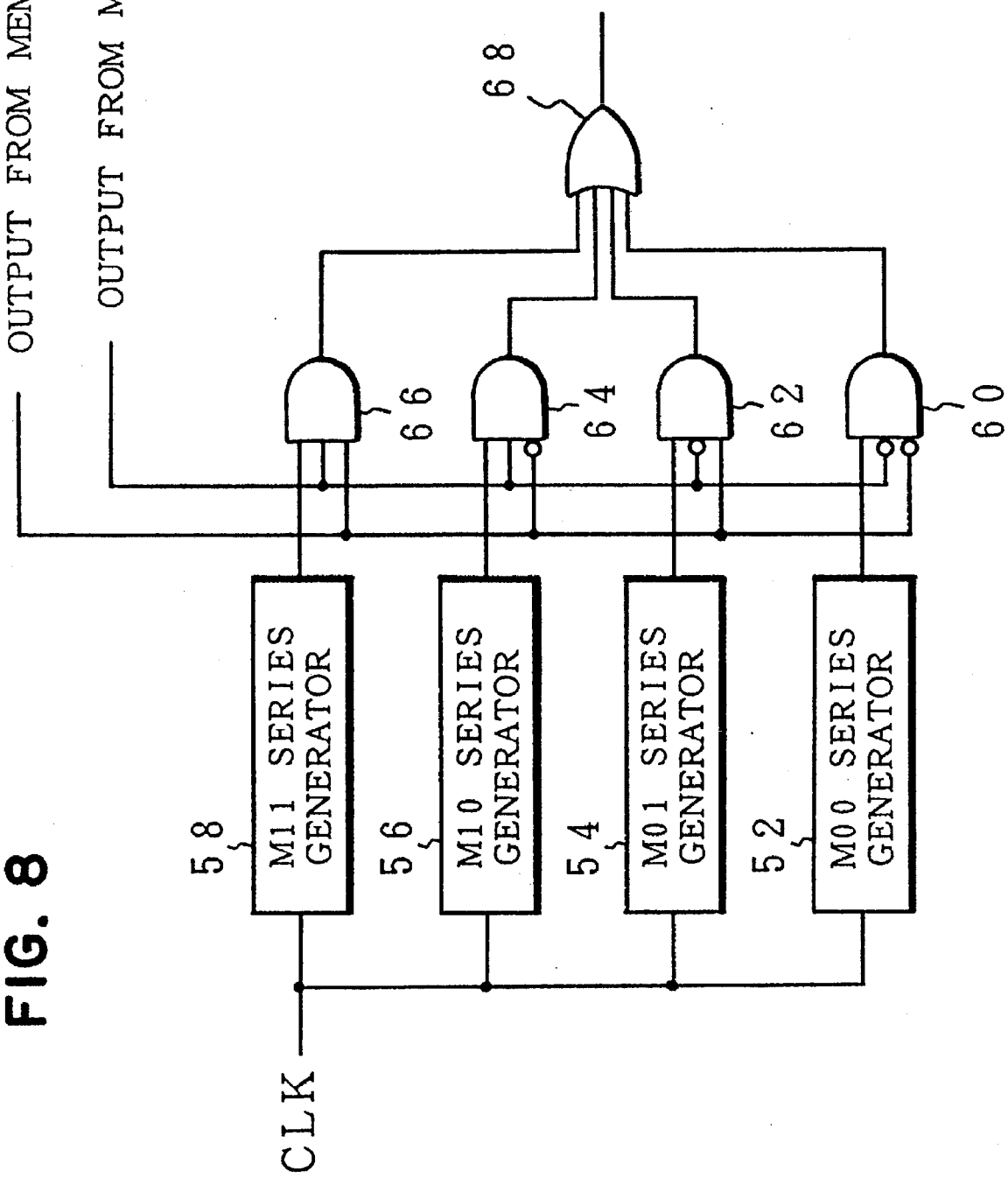
FIG. 8 is a block diagram of a pseudo random series generating section which is used in the data carrier of the invention.

FIG. 8 shows an embodiment of the response section 42 provided for the data carrier 12 in FIG. 2 in the case where the parallel data of a plurality of bits is read out for the data return command as shown in FIGS. 5 to 7. For simplicity of explanation, the embodiment in FIG. 8 will be described with respect to an example of, a two-bit reading in which, for example, two serial memories 44-1 and 44-2 are provided for the memory 40 in FIG. 5.

In FIG. 8, as two-bit outputs of the serial memories 44-1 and 44-2, there are four kinds 00, 01, 10, and 11. Therefore, in correspondence to the above outputs, an M00 series generator 52, an M01 series generator 54, an M10 series generator 56, and an M11 series generator 58 are provided. Each of the series generators 52, 54, 56, and 58 outputs a pseudo random signal of a predetermined code length synchronously with a clock CLK. Outputs of the serial memories 44-1 and 44-2 are inputted in parallel to AND circuits 60, 62, 64, and 66 to which outputs of the series generators 52, 54, 56, and 58 are inputted, respectively. The AND circuit 60 is set into a permission state by inversion signals of the serial memories 44-1 and 44-2 and generates a pseudo random signal M00 from the M00 series generator 52 though an OR circuit 68. That is, the AND circuit 60 modulates a 2-bit output 00 to the pseudo random signal M00. The AND circuit 62 is set into the permission state by memory output bits 01 and generates an output of the M01 series generator 54 from the OR circuit 68. Namely, the AND circuit 62 modulates a 2-bit output 01 to a pseudo random signal M01. The AND circuit 64 is set into the permission state by a memory 2-bit output 10 and generates an output of the M10 series generator 56 through the OR circuit 68. Namely, the AND circuit 64 modulates a 2-bit output 10 to a pseudo random signal M10. The AND circuit 66 is set into the permission state by a memory 2-bit output 11 and generates an output from the M11 series generator 58 by the OR circuit 68. That is, the AND circuit 66 modulates the memory 2-bit output 11 to a pseudo random signal M11.

Figure 9:
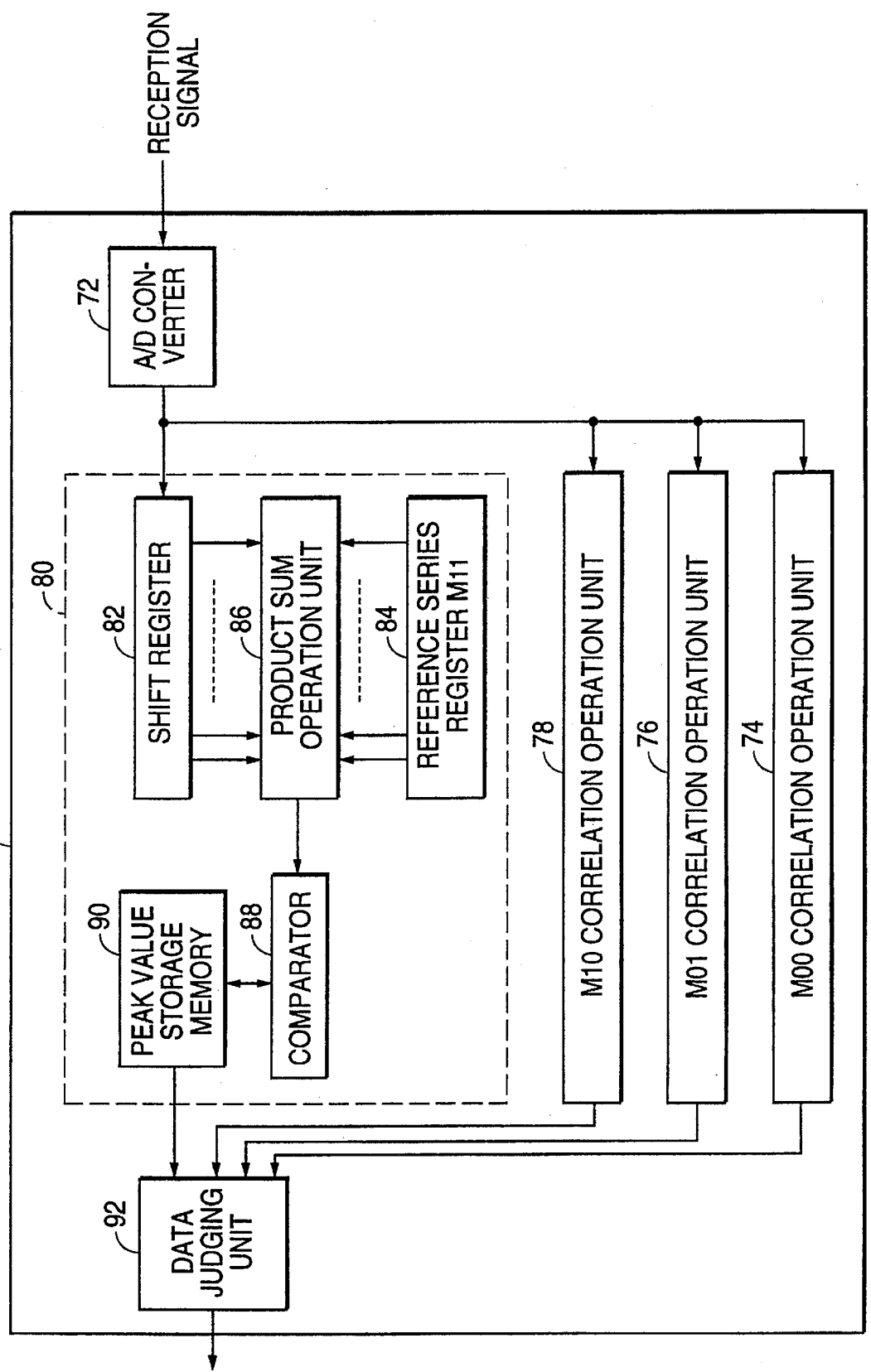
FIG. 9 is a block diagram of a decoding section which is used in a reader/writer of the invention.

FIG. 9 shows an embodiment of the decoding section 28 on the reader/writer 10 side in the case where the parallel 2-bit outputs are modulated to the four kinds of pseudo random signals M00, M01, M10, and M11 and are returned in FIG. 8.

In FIG. 9, the decoding section 28 comprises: an A/D converter 72; an M00 correlation operation unit 74; an M01 correlation operation unit 76; an M10 correlation operation unit 78; an M11 correlation operation unit 80; and a data judging unit 92. Each of the M00 to M11 correlation operation units 74, 76, 78, and 80 has a construction as representatively shown in the M11 correlation operation unit 80. That is, the M11 correlation operation unit 80 comprises: a shift register 82; a product sum operation unit 86; a reference series register 84; a comparator 88; and a peak value storage memory 90. A reception signal is converted to digital data by the A/D converter 72 and is inputted to the shift register 82, so that the product sum operation between the digital data and the reference series M11 of the reference series register 84 is calculated by the product sum operation unit 86. Since timings of the pseudo random signals which are returned at that time are not clear, the maximum correlation value while searching the timing at which the correlation value is largest is obtained by the comparator 88 and is stored into the peak value storage memory 90. Specifically speaking, when the data return command is transmitted from the reader/writer 10, the peak value storage memory 90 is cleared, the product sum operation is continuously executed by the product sum operation unit 86 at every predetermined time, the correlation value at that time and a stored value of the peak value storage memory 90 are compared by the comparator 88, the larger correlation value is saved into the peak value storing memory 90, thereby obtaining the maximum correlation value. The above operations are also executed in parallel in the M00 to M10 correlation operation units 74, 76, and 78. The data judging unit 92 decodes 2-bit data which gave the maximum correlation value among the four maximum correlation values. At that time, there is a case where two kinds of pseudo random signals are demodulated by the data return from a plurality of data carriers. In this case, as shown in the expressions (1) and (2), a specific correlation value is obtained as a correlation of the individual pseudo random signal for the sum of the two pseudo random signals, so that it can be discriminated that the two pseudo random signals were mixedly inputted. A transmitting process of the data collation command shown in steps S6 and S8 in FIG. 3 can be executed.

Various modifications of the invention will now be described. First, as an operation of the data carrier 12 due to the access inhibition command from the access inhibition command section 24 provided for the reader/writer 10 after completion of the reading or writing operation of the data carrier 12 in the second embodiment, both of the response permitting section 34 and the access permitting section 38 have been set into the inhibition state similar to the power-on reset state. The method of cancelling the access state is not limited to the method whereby the power-on reset is again executed after the power source was cut off. Such an access state can be also cancelled in the following cases.

(I) The inhibition state is held until an indication by the access permission command is generated from the reader/writer 10.

(II) The inhibition state is held until the resetting is performed. The resetting is executed by a reset command from the reader/writer 10 or a resetting operation from the reset switch provided for the data carrier 12 itself.

As a response permitting section 34 of the data carrier 12, there is the following response permitting section in addition to that of the above embodiment. For example, data of a specific number of bits from a certain address in the memory 40 is held as a cipher code for the response permission. The reader/writer 10 transmits data which coincides with such a cipher code for the response permission to the data carrier 12 in accordance with the response permission command. The data carrier 12 compares the data received by the response permission command and the cipher code read out from the memory 40. When they coincide, the data carrier is set into the response permission state for the data return command. As mentioned above, by setting to the response permission state associated with the collation of the cipher code, such a state can be applied to the access to the data carriers which are used for different applications by using the same reader/writer 10. For example, a telephone card is assigned as a cipher code (A) and a credit card is assigned as a cipher code (B). The data for collation which is transmitted from the reader/writer 10 in accordance with the response permission command is compared with the cipher codes stored in the memory 40 of the data carrier 12. When the data transmitted by the response permission command is the cipher code (A) for the telephone card, only the data carrier 12 for the telephone card in which the same cipher code (A) has been stored is set into the response permission state.

By such a response permission using the cipher codes, the data carriers each having the same hardware construction and the same software can be selectively used by the cipher codes and the data carrier can be handled as if it were a different media every user group who uses it. Further, since a third person who doesn't know the cipher codes cannot access to the data carrier 12, even if the data carrier 12 is used as a same media by the different user groups, its security can be held.

Moreover, in the response permission using the cipher code, it is desired that all of the cipher codes to be used are different. However, as for the data for collation which is used after the response permission by the cipher codes, so long as an enough number of such data can be assured, those data is not necessarily different. This is because a probability that the data carriers having the same data for collation simultaneously access to the same reader/writer is extremely low from a viewpoint of a using method of the data carriers.

Further, in order to judge that the reader/writer 10 has finished the reading or writing operation for a plurality of data carriers 12, the auto-correlation values by the reception of a decoded signal, for example, the pseudo random signal from the decoding section 28 after the data return command for data collation was transmitted to the data carriers 12 subsequently to the response permission command are monitored. When all of the auto-correlation values are smaller than a threshold value, it can be judged that all of the data carriers responded. As for the response end judgment of the data carriers, when the reception signal of the transmitting section 26 is smaller than the predetermined threshold value at a reception timing by the data return command subsequent to the response permission command, it can be similarly judged that all of the data carriers 12 responded. This judgment is based on that when the reading or writing operation for the data carrier 12 is finished, the access inhibition command is transmitted from the reader/writer 10 and the data carrier 12 is set into the access inhibition state, thereby preventing that the data carrier 12 responds to the data return command for the subsequent response permission commands.

Moreover, in the reader/writer processes in FIG. 3, the presence or absence of the data carrier has been judged in step S1. The detection of the data carrier for this purpose, however, can be also performed by a sensor or by a method whereby a predetermined test command is generated and the presence or absence of the response data for the test command is discriminated.

It is also possible to merely periodically repeat the transmission of the response permission command without using another command such as a test command or the like. As for such a periodical transmission of the response permission command, when the data carrier enters an accessible area of the reader/writer 10, the processing routine can be immediately shifted to the collating process without needing the detection of the data carrier.

As mentioned above, according to the invention, even if a plurality of data carriers simultaneously access to one reader/writer, necessary data can be read or written from/to each of the data carriers. In the case where a plurality of articles to which the data carriers are attached are processed in a lump or the like, it is unnecessary that the user takes the articles to which the data carriers are attached one by one and accesses to the reader/writer, handling processes of the articles can be extremely simplified as compared with a bar code reading system as a main stream at present. Further, since a generality such that the same data carrier can be used for different applications is high, a mass production of the data carriers can be realized and the manufacturing costs can be reduced. The data processing apparatus using the reader/writer and data carriers according to the invention can be widely spread.

As data carriers of the invention, various data carriers such as portable type, desk-top type, and the like are also included. As a shape, all of proper shapes such as circle, rectangle, card shape, and the like are included. As a power supply to the data carrier, the transmission signal from the reader/writer, for example, an FSK signal is rectified and can be used as a power source or the apparatus can also have a battery therein.

What is claimed is:

1. A data processing apparatus for performing at least a data reading operation from data carriers by a reader/writer, wherein said data carrier comprises:
    a memory for holding data;
    response means for returning a predetermined signal in accordance with the data read out from said memory when receiving a predetermined command from said reader/writer;
    response permitting means for permitting said response means to return the data; and data collating means for collating data for collation added to a data collation command transmitted from said reader/writer and the data held in said memory and, when the collation succeeds, for permitting the reading of next data, said reader/writer comprises:
response permission command means for permitting said response means of said data carrier to permit the return of the data;
data return command means for returning a signal corresponding to the data from said memory held in said data carrier;
decoding means for decoding the reception data returned from said data carrier; and
data collation command means for allowing said data collating means of said data carrier to collate said reception data decoded by said decoding means.

2. An apparatus according to claim 1, wherein
when the collation by said data collating means fails, said data carrier inhibits a response of said response permitting means.

3. An apparatus according to claim 1, wherein
when permitting a response by said response permitting means, said data carrier permits the reading of a certain specific address and,
after said data carrier was set to a response permission state by using said response permitting means, said reader/writer allows said data collation command means to collate the read-out data obtained by said data return command means with data up to a predetermined data length.

4. An apparatus according to claim 3, wherein
said data carrier includes access permitting means for permitting at least the reading from all or a part of areas in said memory when said data collating means succeeds in collation of the data of the predetermined data length.

5. An apparatus according to claim 4, wherein
when receiving an access inhibition command from said reader/writer, said data carrier sets said access permitting means and said response permitting means to an inhibition state, and
said reader/writer has access inhibition command means for setting said access permitting means and said response permitting means of said data carrier to an access inhibition state.

6. An apparatus according to claim 4, wherein
when receiving the access inhibition command from said reader/writer, said data carrier sets said access permitting means and said response permitting means to the inhibition state until an access permission command is received from said reader/writer and
said reader writer includes:
access inhibition command means for setting said access permitting means and said response permitting means of said data carrier to an access inhibition state; and
access permission command means for setting said data carrier in the access inhibition state to an accessible state.

7. An apparatus according to claim 4, wherein
when receiving the access inhibition command from said reader/writer, said data carrier sets the reading from said memory by said access permitting means and said response permitting means to an absolute inhibition state, at the time of a power-on reset, said data carrier releases the absolute inhibition state of the reading based on said access inhibition command and sets to a readable state, and said reader/writer has access inhibition command means for setting the reading from said data carrier to the absolute inhibition state.

8. An apparatus according to claim 1, wherein
said reader/writer allows said data collating means to collate by using possible decoded data when the decoded data obtained by said decoding means cannot be not correctly decoded.

9. An apparatus according to claim 1, wherein
said response permitting means of said data carrier compares data of a predetermined data length in a predetermined address of said memory and response permission data which is sent from said reader/writer and permits a return of the data when all or a specific portion of the data coincides.

10. A data processing apparatus for performing at least a data reading operation from data carriers by a reader/writer, wherein
said data carrier comprises:
a memory for holding data; and
data collating means for collating data for collation added to a data collation command sent from said reader/writer and data held in said memory and, when the collation succeeds, for permitting the reading of next data and said reader/writer comprises:
response permission command means for allowing response means of said data carrier to permit the return of the data;
data return command means for returning a pseudo random signal according to the data from said memory held in said data carrier;
correlation operating means for calculating an auto-correlation between the pseudo random signal returned from said data carrier and a predetermined pseudo random signal;
decoding means for decoding reception data from the auto-correlation obtained from said correlation operating means; and
data collation command means for allowing said data collating means of said data carrier to collate the reception data decoded by said decoding means.

11. An apparatus according to claim 10, wherein
said data carrier inhibits said response permitting means to respond when the collation by said data collating means fails.

12. An apparatus according claim 11, wherein
said data carrier permits the reading of a certain specific address when permitting the response by said response permitting means and
said reader/writer allows said data collation command means to collate the read-out data obtained by said data return command means with data up to a predetermined data length after said data carrier was set to a response permission state by using said response permitting means.

13. An apparatus according to claim 12, wherein
said data carrier has access permitting means for permitting at least the reading from all or a portion of areas in said memory when the data collating means succeeds in collation of the data of the predetermined length.

14. An apparatus according to claim 12, wherein said reader/writer doesn't transmit said data collation command but transmits a next data return command when only one kind of auto-correlation value among a plurality of correlation values obtained by said correlation operating means is equal to or larger than a threshold value, and said data carrier returns predetermined data according to the read-out data from said memory in accordance with said data return command and, after that, when receiving said data return command again, it is regarded that the data collation according to said data collation command succeeds.

15. An apparatus according to claim 10, wherein when any two or more kinds of auto-correlation values among a plurality of correlation values obtained by said correlation operating means are larger than a threshold value, said reader/writer allows said data collating means to collate said data by using any one of decoded data of said plurality of auto-correlation values.

16. An apparatus according to claim 13, wherein said data carrier sets said access permitting means and said response permitting means to an inhibition state when receiving an access inhibition command from said reader/writer, and said reader/writer has access inhibition command means for setting said access permitting means and said response permitting means of said data carrier to an access inhibition state.

17. An apparatus according to claim 13, wherein when receiving the access inhibition command from said reader/writer, said data carrier sets said access permitting means and said response permitting means to the inhibition state until the access permitting command is received from said reader/writer, and said reader/writer has
    access inhibition command means for setting said access permitting means and said response permitting means of said data carrier to the access inhibition command state and
    access permission command means for setting said data carrier in the access inhibition state to an accessible state.

18. An apparatus according to claim 13, wherein when receiving the access inhibition command from said reader/writer, said data carrier sets the reading from said memory by said access permitting means and said response permission means to an absolute inhibition state and, at the time of a power-on reset, said data carrier releases said absolute inhibition state of the reading based on said access inhibition command and sets to a readable state, and said reader/writer has access inhibition command means for setting the reading from said data carrier to the absolute inhibition state.

19. An apparatus according to claim 10, wherein when all of the auto-correlation values obtained by said correlation operating means are smaller than a threshold value, said reader/writer judges that response processes with all of the data carriers were finished.

20. An apparatus according to claim 10, wherein when a signal obtained from a transmitting section is smaller than a certain threshold level, said reader/writer judges that the response processes with all of the data carriers were finished.

21. An apparatus according to claim 10, wherein said response permitting means of said data carrier compares data of a predetermined data length in a predetermined address of said memory and response permission data which is sent from said reader/writer and permits the return of the data when all or a specific portion of the data coincides.

* * * * *